Patented July 4, 1939

2,164,565

UNITED STATES PATENT OFFICE 2,164,565

RUST INHIBITOR

Edgar C. Britton, Howard S. Nutting, and Peter S. Petrie, Midland, Mich., assignors to The Dow Chemical Company, Midland, Mich., a corporation of Michigan No Drawing. Application May 3, 1937, Serial No. 140,457

7 Claims. (Cl. 252—5)

The present invention relates to a corrosion inhibitor for use with water and aqueous solutions of nonelectrolytes in contact with metals, particularly iron and steel. It also pertains to liquids comprising such inhibitor.

The corrosion of metals in contact with water and aqueous solutions of non-electrolytes due to the effect of dissolved oxygen, traces of electrolytes, etc., is well known. An object of the present invention is to provide an inhibitor which when added in small proportions to water or aqueous solutions of non-electrolytes will largely prevent the corrosion of metals, particularly iron and steel.

We have now discovered that if a small proportion of an aralkyl mono-amine is added to water or an aqueous solution of a non-electrolyte, such solution when in contact with a metal even over a long period of time will remain clear and free of rust particles and the metal will remain bright and unattacked.

The aralkyl mono-amines which we have found to be effective inhibitors have the generic formula Ar—$(CH_2)_n$—$NH_2$ wherein Ar is an aromatic radical which may contain alkyl, halogen, or other neutral substituents, and $n$ is an integer. Examples of such aralkyl mono-amines are: benzylamine, alpha-phenylethylamine, beta-phenylethylamine, 2,4-dimethylbenzylamine, etc.

Among the fluids with which our new inhibitor is effective are water and aqueous solutions comprising at least one aliphatic alcohol. The term "alcohol" as herein employed refers both to monohydric and polyhydric aliphatic alcohols, e. g. methanol, ethanol, isopropanol, ethylene glycol, propylene glycol, and glycerol. Such fluids are commonly employed in fluid-pressure transmission systems, as heat-transfer liquids in automobile cooling systems, etc.

To prepare non-corrosive fluids in accordance with the invention a small proportion, e. g. 0.02–2.0 per cent by weight, preferably 0.2–1.5 per cent, of at least one aralkyl mono-amine is added to the water or an aqueous solution of a non-electrolyte, e. g. methanol, ethanol, ethylene glycol, glycerol, etc. If desired, various additional substances, e. g. oils, dyes, caustic soda, etc., may be added to the non-corrosive solutions comprising our new inhibitors, or the latter may initially be mixed with such additional substances, and the mixture may thereafter be added to water or aqueous solutions to be inhibited. Similarly the inhibitor may first be added to the non-electrolyte and water thereafter added.

The following examples, which are not to be construed as limiting the invention, are given to show the effectiveness of the non-corrosive fluids prepared according to the present invention as compared to similar liquids omitting the corrosion inhibitor.

Example 1

Samples of a 50 per cent by weight aqueous solution of ethylene glycol containing various proportions of benzylamine were prepared and tested for corrosive action on iron as follows: A 200 c. c. portion of such solution was placed in a flask and a weighed metal specimen (1.5" x 1.0" x 0.25") cut from an engine block was added. The flask and contents were maintained at a temperature of 80°–90° C. for one week, during which time air was bubbled continuously into the hot solution. At the end of this period the solution and specimen were examined, and the latter was cleaned and weighed. From the loss in weight and known area of the specimen the rate of corrosion, expressed as inches penetration per year, was computed. The following table gives the per cent by weight of benzyl-amine in each solution subjected to test and the results of the tests:

| Concentration of benzylamine (per cent) | Appearance at end of test | | Corrosion rate inches per year |
|---|---|---|---|
| | Solution | Sample | |
| 0 | Rusty | Badly corroded | .0088 |
| 0.25 | Slightly discolored | Bright; slightly pitted | .0024 |
| 1.50 | Clear | Bright; unattacked | .0000 |

Example 2

Two portions of an aqueous 50 per cent by weight solution of ethylene glycol, one containing 0.5 per cent of beta-phenyl-ethylamine and the other containing no inhibitor were placed in separate flasks, and an iron test specimen was added to each. The flasks and contents were maintained at 80°–90° C. and air was bubbled continuously through the hot liquid. At the end of one day's test, the metal in the uninhibited solution was badly corroded and the solution itself was discolored with rust. Even after four days such aeration, however, the inhibited solution was clear and free of particles, and the metal specimen was bright and substantially unattacked.

Under the severe test conditions used in the above examples the rate of corrosion of the metal was many times greater than it would be during usual employment of such solution, as, for instance, in an automobile radiator.

Other modes of applying the principle of our invention may be utilized, change being made as regards the ingredients herein stated, provided the ingredients stated by any of the following claims or the equivalent of such stated ingredients be employed.

We therefore particularly point out and distinctly claim as our invention:

1. A non-corrosive fluid-pressure transmission and heat-exchange medium comprising a liquid selected from the group consisting of water and aliphatic alcohols as the major ingredient together with an aralkyl amine inhibitor having the general formula $Ar-(CH_2)_x-NH_2$ wherein Ar is an aromatic radical and $n$ is an integer.

2. A non-corrosive fluid-pressure transmission and heat-exchange medium comprising water as the major ingredient together with an aralkyl amine inhibitor having the general formula $Ar-(CH_2)_x-NH_2$ wherein Ar is an aromatic radical and $n$ is an integer.

3. A non-corrosive fluid-pressure transmission and heat-exchange medium comprising an aliphatic alcohol as the major ingredient together with an aralkyl amine inhibitor having the general formula $Ar-(CH_2)_x-NH_2$ wherein Ar is an aromatic radical and $n$ is an integer.

4. A non-corrosive fluid-pressure transmission and heat-exchange medium comprising an aqueous solution of an aliphatic alcohol as the major ingredient together with an aralkyl amine inhibitor having the general formula $$Ar-(CH_2)_x-NH_2$$

wherein Ar is an aromatic radical and $n$ is an integer.

5. A non-corrosive fluid-pressure transmission and heat-exchange medium comprising an aqueous solution of ethylene glycol as the major ingredient together with an aralkyl amine inhibitor having the general formula $$Ar-(CH_2)_x-NH_2$$

wherein Ar is an aromatic radical and $n$ is an integer.

6. A non-corrosive fluid-pressure transmission and heat-exchange medium comprising an aqueous solution of an aliphatic alcohol as the major ingredient together with benzyl amine.

7. A non-corrosive fluid-pressure transmission and heat-exchange medium comprising an aqueous solution of an aliphatic alcohol as the major ingredient together with beta-phenylethyl amine.

EDGAR C. BRITTON.
HOWARD S. NUTTING.
PETER S. PETRIE.